United States Patent
Rubero et al.

(10) Patent No.: US 8,818,784 B1
(45) Date of Patent: Aug. 26, 2014

(54) HARDWARE DESCRIPTION LANGUAGE (HDL) INCORPORATING STATISTICALLY DERIVED DATA AND RELATED METHODS

(75) Inventors: Jason Rubero, Moscow, ID (US); Jonathan Thurgood, Pullman, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1328 days.

(21) Appl. No.: 11/136,873

(22) Filed: May 25, 2005

Related U.S. Application Data (60) Provisional application No. 60/582,178, filed on Jun. 23, 2004.

(51) Int. Cl.
  *G06F 17/50* (2006.01)
(52) U.S. Cl.
  USPC .......................................................... 703/14
(58) Field of Classification Search
  USPC .......................................................... 703/14
  See application file for complete search history.

(56) References Cited

U.S. PATENT DOCUMENTS

| | | | |
|---|---|---|---|
| 5,684,946 A | 11/1997 | Ellis et al. | |
| 6,291,254 B1 * | 9/2001 | Chou et al. | 438/18 |
| 6,312,963 B1 * | 11/2001 | Chou et al. | 438/18 |
| 6,381,564 B1 * | 4/2002 | Davis et al. | 703/22 |
| 6,430,729 B1 * | 8/2002 | Dewey et al. | 716/115 |
| 6,449,749 B1 * | 9/2002 | Stine | 716/56 |
| 6,496,962 B1 | 12/2002 | Dalton | |
| 6,594,816 B1 | 7/2003 | Hauck | |
| 6,678,645 B1 | 1/2004 | Rajsuman et al. | |
| 6,745,264 B1 | 6/2004 | Luke et al. | |
| 6,816,825 B1 | 11/2004 | Ashar et al. | |
| 6,850,877 B1 * | 2/2005 | Sengupta | 703/14 |
| 7,003,742 B2 * | 2/2006 | Saxena et al. | 716/102 |
| 7,047,505 B2 * | 5/2006 | Saxena et al. | 716/2 |
| 7,050,950 B2 * | 5/2006 | Goebel | 703/2 |
| 7,472,320 B2 * | 12/2008 | Berndlmaier et al. | 714/724 |
| 2005/0132306 A1 * | 6/2005 | Smith et al. | 716/1 |
| 2005/0206394 A1 * | 9/2005 | Arora et al. | 324/658 |
| 2005/0251373 A1 * | 11/2005 | Daems et al. | 703/2 |
| 2005/0257178 A1 * | 11/2005 | Daems et al. | 716/2 |

OTHER PUBLICATIONS

Devarayanadurg et al. "Hierarchy based Statistical Fault Simulation of Mixed-Signal ICs" IEEE 1996; pp. 521-527.*
McCarthy et al. "Efficient Methodologies for Statistical Characterization of Analog Designs for Submicron CMOS Technologies", 1999.*
Rubero, Jason and Thurgood, Jonathan, "Verllog-A/DoE: Simulating Behavorial Models Over Corners", *SOCcentral*, Jul. 8, 2005, www.soccentral.com.

* cited by examiner

*Primary Examiner* — Shambhavi Patel (57) ABSTRACT

A method of designing a circuit can include modeling one or more circuits in a hardware design language (HDL) (102) and confirming a basic behavior of such models (104). If a basic behavior has been met, the model can be modified to include an algorithm that is based on an experimental statistical analysis of manufactured circuits representing particular condition (e.g., factor) limits (referred to as "corners") (106). Once a circuit model has been modified to include an algorithm that can represent performance corners, a simulation can be run that will represent circuit response at such an operational corner (110).

19 Claims, 12 Drawing Sheets

```
1  module subcircuit0 (Sin, Sout)
2  delay = 5
3  begin

4  @ (event)
5      begin
6  circuit_delay = t0 + delay
7      end
8  endmodule
```

FIG. 2A (CONVENTIONAL)

```
1  module subcircuit0_corner (Sin, Sout)

2  delay = 5

3  factor1 = {set to +1 or -1 according to desired corner}
4  factor2 = {set to +1 or -1 according to desired corner}

5  begin

6  @ (initial step)
7     begin
8         a0 = 5
9         a1 = 0.10
10        a2 = 0.05
11        delay = a0 + a1*factor1 + a2* factor2 +
                  a1*a2*factor1*factor2
12    end 13 @ (event)
14    begin 15       circuit_delay = t0 + delay 16    end 17 endmodule
```

```
// DOE Factors for use in Response Equations
//// mosp: s -> -1, f -> 1
//// mosn: s -> -1, f -> 1
//// temp: -40 -> -1, 125 -> 1
//// vdd: 2.7 -> -1, 3.9 -> 1
```
600

602

```
`include "constants.h"
`include "discipline.h"

module verilog_doe_pfd(FBIn, RefByQ, UpM, Dn, vpwr, vgnd);
electrical FBIn, RefByQ, UpM, Dn, vpwr, vgnd;
input   FBIn, RefByQ;
output  UpM, Dn;
inout   vpwr, vgnd;

parameter real ttol = 1p;

*****
analog
begin threshold = V(vpwr,vgnd)/2;

// functional description refers to parameters dn_delay and
dn_runtime
```

```
@(cross(V(FBIn, vgnd) - threshold, -1, ttol))
  begin
    tdn = $abstime + dn_delay - (dn_rtime/0.6*0.5);
  end
```
604

606

// initial steps establish values for parameters dn_delay and
dn_runtime according to DoE algorithm and indicated corner
conditions

```
  @(initial_step)
  begin
```

// DoE factor variables set according to corner condition by
script

```
x1 = mosp;                                              608-0
x2 = mosn;
x3 = (temp - ((-40 + 125) / 2.0)) / (125 - ((-40 + 125) /
2.0));
x4 = (vdd - ((2.7 + 3.9) / 2.0)) / (3.9 - ((2.7 + 3.9) / 2.0));
```

FIG. 6A

// interaction variables derived from factor values

```
x1x2 = x1*x2;
x1x3 = x1*x3;
x1x4 = x1*x4;
x2x3 = x2*x3;
x2x4 = x2*x4;
x3x4 = x3*x4;
x1x2x3 = x1*x2*x3;
x1x2x4 = x1*x2*x4;
x1x3x4 = x1*x3*x4;
x2x3x4 = x2*x3*x4;
x1x2x3x4 = x1*x2*x3*x4;
```
← 608-1

// DoE dependent coefficients for multi-regression equation representing parameter dn_delay

```
a0 = 1.0E-8 ;
a1 = -2.0E-10;
a2 = -1.0E-10;
a3 = 2.0E-10 ;
a4 = -3.0E-10;
a1a2 = 2.0E-10 ;
a1a3 = -2.0E-10;
a1a4 = 6.0E-10 ;
a2a3 = -6.0E-10;
a2a4 = 4.0E-10 ;
a3a4 = -3.0E-10;
a1a2a3 = 3.0E-10 ;
a1a2a4 = -8.0E-10;
a1a3a4 = 1.0E-12 ;
a2a3a4 = 9.0E-10 ;
a1a2a3a4 = 2.0E-10 ;
```
← 610

// multi regression equation for parameter dn_delay uses variables based on corner conditions and above experimentally derived coefficients
612

```
dn_delay = a0 + (a1 * x1) + (a2 * x2) + (a3 * x3) + (a4 * x4) +
(a1a2 * x1x2) + (a1a3 * x1x3) + (a1a4 * x1x4) + (a2a3 * x2x3) +
(a2a4 * x2x4) + (a3a4 * x3x4) + (a1a2a3 * x1x2x3) + (a1a2a4 *
x1x2x4) + (a1a3a4 * x1x3x4) + (a2a3a4 * x2x3x4) + (a1a2a3a4 *
x1x2x3x4);
```

FIG. 6B

```
// DoE dependent coefficients for multi-regression equation
representing parameter dn_rtime a0 = 174.64E-12 ;
  a1 = -27.31E-12;
  a2 = -2.39E-12;
  a3 = 27.46E-12 ;
  a4 = -25.70E-12;
  a1a2 = 765.75E-15 ;
  a1a3 = -4.19E-12;
  a1a4 = 6.31E-12 ;
  a2a3 = -950.87E-15;
  a2a4 = 1.45E-12 ;
  a3a4 = -3.91E-12;
  a1a2a3 = 10.63E-15 ;
  a1a2a4 = -218.37E-15;
  a1a3a4 = 481.87E-15 ;
  a2a3a4 = -76.50E-15;
  a1a2a3a4 = 90.00E-15 ;

// multi regression equation for parameter dn_rtime uses
variables based on corner conditions and above experimentally
derived coefficients dn_rtime = a0 + (a1 * x1) + (a2 * x2) + (a3 * x3) + (a4 * x4)
+ (a1a2 * x1x2) + (a1a3 * x1x3) + (a1a4 * x1x4) + (a2a3 * x2x3)
+ (a2a4 * x2x4) + (a3a4 * x3x4) + (a1a2a3 * x1x2x3) + (a1a2a4 *
x1x2x4) + (a1a3a4 * x1x3x4) + (a2a3a4 * x2x3x4) + (a1a2a3a4 *
x1x2x3x4);

end endmodule
```

HARDWARE DESCRIPTION LANGUAGE (HDL) INCORPORATING STATISTICALLY DERIVED DATA AND RELATED METHODS

This application claims the benefit of U.S. Provisional Patent Application Ser. No. 60/582,178 filed on Jun. 23, 2004, the contents of which are incorporated by reference herein.

TECHNICAL FIELD

The present invention relates methods, processes and systems for designing, modeling and/or simulating integrated circuits.

BACKGROUND OF THE INVENTION

The complexity of modern microelectronic circuit designs has given rise to the concept of circuit modeling, whereby transistor-level behaviors may be represented by Hardware Description Language (HDL) constructs, including but not limited to Verilog-A, VHDL, VHDL-AMS, Verilog-AMS, Verilog®, SystemC, and other HDL languages. These behavioral models allow significantly faster simulation times than conventional transistor simulation models (e.g., SPICE™).

Conventional HDL modeling is typically used as part of a standard circuit design flow to provide a representation of circuit behavior.

To better understand various aspects of the embodiments of the invention set forth below, conventional methods for circuit modeling/simulation will now be described.

Figure 10:
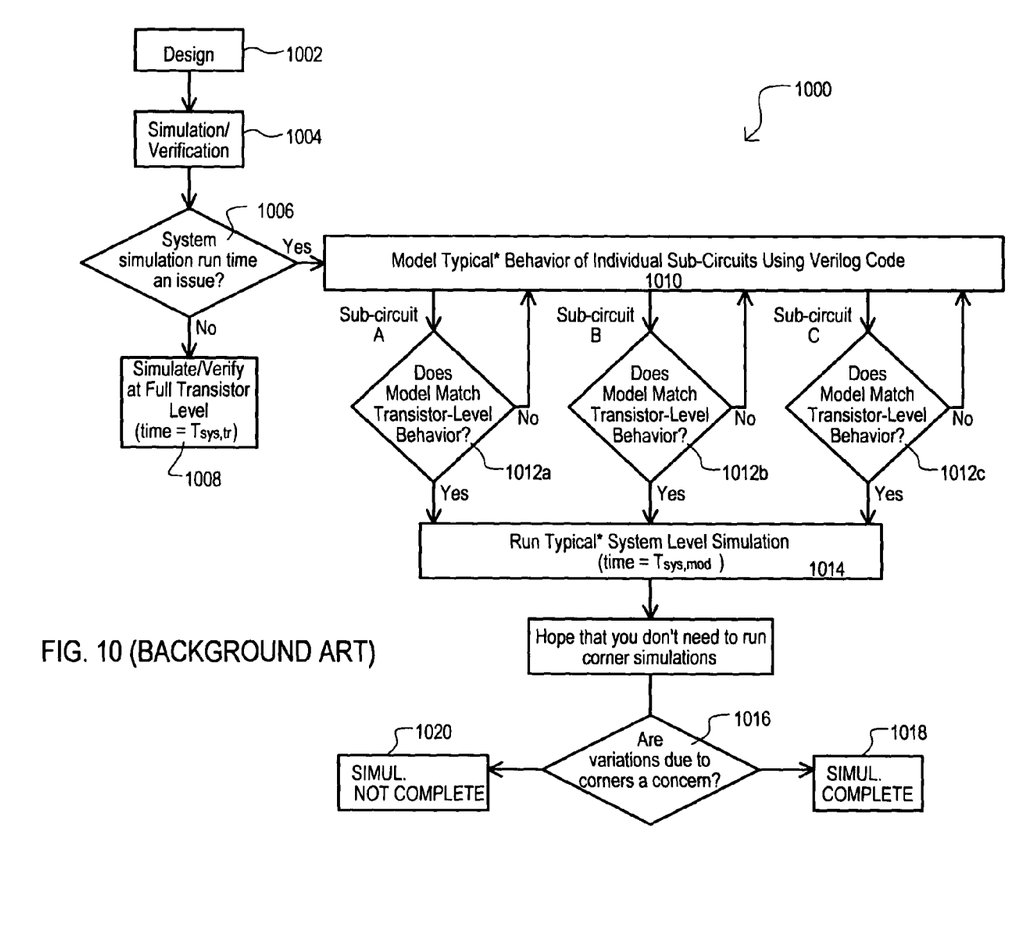
FIG. 10 is a flow diagram of a conventional method for circuit modeling and simulation.

FIG. 10 shows a conventional method for circuit modeling and simulation. The method is designated by the general reference character 1000, and can include creating a design 1002 and then proceeding to execute a simulation/verification of the design 1004. In undertaking a simulation/verification, a method 1000 can first determine if simulation runtime is an issue 1006. If simulation runtime is not an issue, the design can be simulated at a full transistor level 1008. Time involved in such a simulation is notated as $T_{sys,tr}$. That is, a simulation runtime can generally depend upon the number of total transistors contained in the design.

If simulation runtime is an issue, a method 1000 can include modeling each sub-circuit of the overall circuit using an HDL code 1010. In the conventional example of FIG. 10, an HDL can be Verilog, and the circuit can include three sub-circuits A-C. As shown in FIG. 10, sub-circuit HDL models can represent a "typical" behavior. That is, the models will represent circuit behavior at some nominal temperature and power supply level.

Each modeled sub-circuit can be examined to determine if the sub-circuit properly matches a transistor level behavior of the sub-circuit (1012a to 1012c). In the event a model does not match a desired behavior, the model can be modified or substituted with another model (return to step 1010).

Once the sub-circuit HDL models provide the desired behavior, an overall system simulation can be run 1014. That is, a simulation can be run that integrates all sub-circuit models together. As in the case of the sub-circuit models, system level simulation can also represent a "typical" behavior. Time involved in such a simulation is notated as $T_{sys,mod}$. That is, a simulation runtime can generally depend upon the number of sub-circuits included in the overall design.

Once a system level simulation has been run, method 1000 also includes determining whether or not variations due to "corners" of a device being modeled/simulated are a concern (step 1016). Corners are understood to be variations that can occur in manufacturing and/or operation of a device. As but a few examples, corners can represent the outside limits, or predetermined points between such limits, of manufacturing variations, operating voltages and/or operating temperatures, and combinations thereof. If corner variations are not a concern, a simulation can be complete (step 1018). If however, corner variations are a concern, the simulation results cannot be considered complete, as the simulation may be too inaccurate (step 1020).

Thus, while a conventional "fast" approach of FIG. 10 can allow for quick simulation of the functionality of a circuit, accuracy can be sacrificed because the models utilized may not reflect deviations in circuit behavior due to changes in fabrication process, supply voltage, and ambient temperature, sometimes referred to as process-voltage-temperature (or "PVT") corners.

Disadvantages of conventional modeling solutions, like that shown in FIG. 10, can be that simulation results may not be accurate over variations in fabrication processing, temperature, or supply voltage. This can make such models unsuitable for use in verifying that a design can meet predetermined specifications over such corners.

Figure 11:
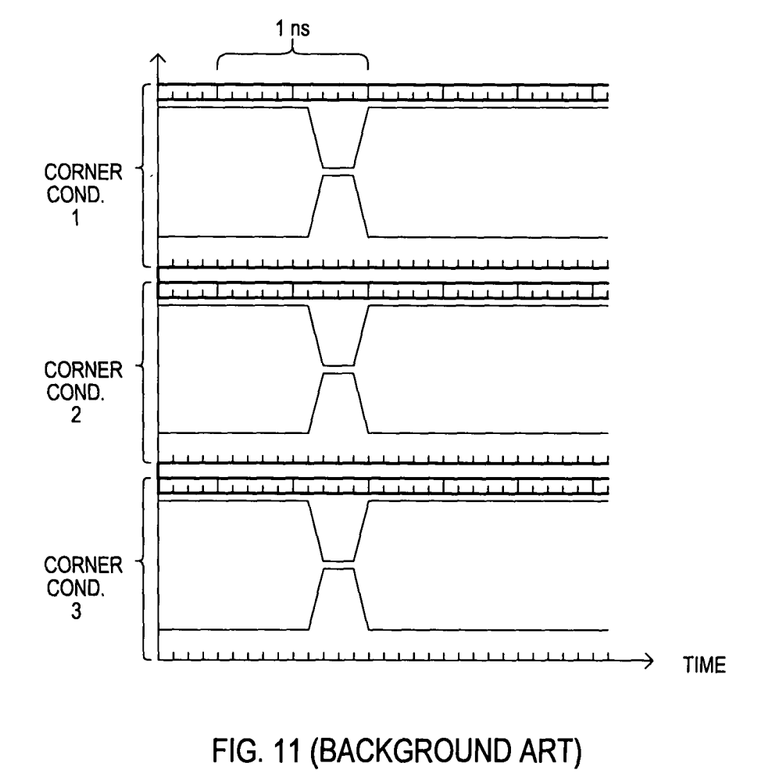
FIG. 11 shows timing diagrams illustrating conventional simulation results.

For example, FIG. 11 shows the response of a circuit modeled conventionally. Simulation was performed at three different PVT corner conditions: CORNER COND. 1, CORNER COND. 2 and CORNER COND. 3. As shown, such a model provides no variation in simulation response under such different corner conditions. This may not accurately reflect changes occurring at such corner conditions in an actual circuit (or circuit portion) that is manufactured.

In light of the above, it would be desirable to have a quick and reliable simulation technique for modeling performance of designs over expected variations, such as PVT corners.

SUMMARY OF THE INVENTION

According to an embodiment, a method of modeling circuits can include incorporating algorithms derived from Design of Experiments (DoE), or other statistical analyses, to reflect changes in a circuit behavior over experimental factor limits ("corners"). Such an arrangement can allow for faster circuit simulations (at block and system level), while preserving simulation accuracy. As is well understood, Design of Experiments is an analytical method that can be used to measure the relative sensitivities of system input variables on one or more output responses.

Even more particularly, the present invention can include a method for designing circuits that includes creating an HDL model for one or more circuits that each include an algorithm for a parameter value derived from a multi-factor statistical analysis. Such an analysis can have been performed on lower level (e.g., more detailed) models of the circuit. A higher level simulation can be executed for such circuits with the modified HDL model. Thus, such an HDL model can present corner condition responses not reflected in a conventional HDL model.

According to one aspect of the embodiments, a method can also include performing a design of experiments (DoE) statistical analysis on lower level models of the circuit to gather parameter data for the circuit.

According to another aspect of the embodiments, a method can include establishing variables for a parameter value algorithm that represent a corner condition for a modeled circuit. The corner conditions can correspond to DoE factor values at high or low limits, as well as fixed points in between, such as a midpoint level. In very particular examples, DoE factor values can include any of a highest or lowest operating temperature, a highest or lowest power supply voltage, a highest or lowest predetermined transistor performance characteristic (e.g., speed), including both p-channel and n-channel transistors in the case of a CMOS design.

According to another aspect of the embodiments, variables that represent corner conditions can be normalized variables. Thus, establishing such variables includes setting such variables to +1 or −1. In the case of higher order experiments, such variables can also be 0, to indicate midpoint factor value.

According to another aspect of the embodiments, performing a DoE analysis can include processing raw characterization data for a behavioral model for the at least one circuit to derive effect values. A response algorithm can then be formed for a parameter based on the effect values. Further, including algorithms into HDL models can involve annotating an HDL construct of the response algorithm into the behavioral model.

The present invention can also include a circuit model embodied in at least one machine readable medium having a plurality of sub-circuit models. Each sub-circuit model can include an HDL description of the sub-circuit having a function dependent upon a variable, and an algorithm for generating a value for the variable based on DoE analysis of lower level models of the sub-circuit.

According to one aspect of the embodiments, an algorithm can include a multiple regression equation, with coefficient terms and independent variables. The independent variables can correspond to DoE factor limits. Coefficient terms can be derived from effectiveness values corresponding to the DoE factors.

According to another aspect of the embodiments, independent variables can further include DoE factor combinations representing interaction of DoE factors. In addition, the coefficient terms can be derived from effectiveness values corresponding to interactions of the DoE factors.

According to another aspect of the embodiments, a variable can be any of, but not limited to, a resistor model, a capacitor model, a transistor model, a temperature value, a power supply value, or control input or value for a circuit model.

The present invention can also include a system for integrating actual circuit performance data into a hardware design language model of the circuit. The system can include one or more processors and model code for a number of sub-circuit models. Each sub-circuit model can include description code that defines a function of the sub-circuit and one or more parameters that incorporate DoE analysis results for lower level (i.e., more detailed) models of the sub-circuit. Such parameter values can be dependent upon DoE condition factors. The system can also include a setting code for establishing DoE condition factors for each sub-circuit model.

According to one aspect of the embodiments, a system can further include simulator code that generates simulation result data based on the sub-circuit models performing at DoE condition factors established by the setting code.

DETAILED DESCRIPTION

Various embodiments of the present invention will now be described in detail with reference to a number of drawings. The embodiments include methods, systems and circuit models that can incorporate parameters based on statistical experimental results. Such arrangements can represent an overall circuit/system incorporating the circuit models at operational "corners". Operational corners can represent limits in operational and/or manufacturing conditions, including but not limited to, variations due to manufacturing process, ambient temperature, and/or power supply voltage.

Figure 1:
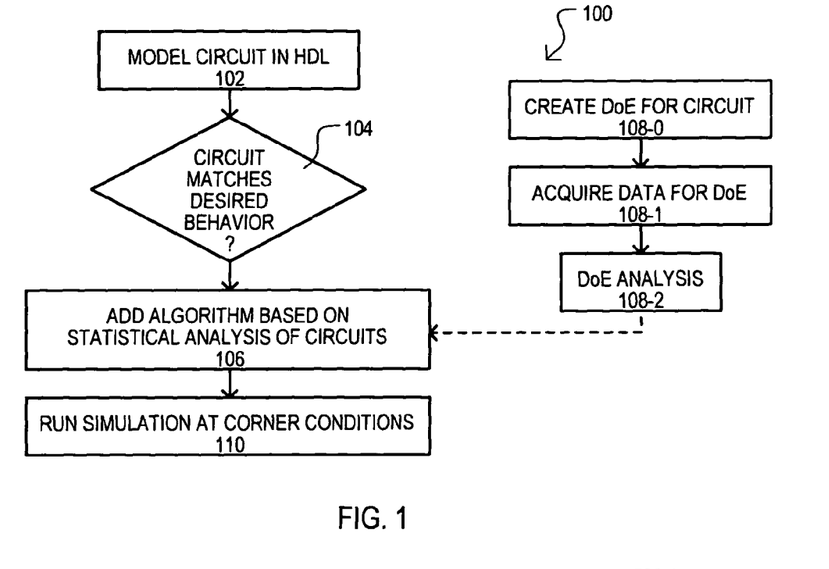
FIG. 1 is a flow diagram of a first embodiment of the present invention.

Referring now to FIG. 1, a method of designing a circuit according to a first embodiment of the present invention is set forth in a flow diagram and designated by the general reference character 100. A method 100 can include modeling a circuit in a hardware design language (HDL) (step 102). A step 102 can include describing circuit performance in terms of a desired function according to conventional techniques. Once a circuit has been modeled, the model can be checked to determine if it matches a desired basic behavior (step 104). For example, a step 104 can include ensuring that the model matches an expected transistor level behavior. If a basic behavior has not been met, a method 100 can return to a step 102 to arrive at a new model.

If a basic behavior has been met, the model can be modified to include an algorithm that is based on an experimental statistical analysis of circuits representing condition limits ("corners") (step 106). In the very particular example of FIG. 1, such an algorithm can be based on a design of experiments (DoE) analysis.

In the particular example of FIG. 1, a step 106 can make modifications to a circuit model based on the steps of: creating a DoE for a circuit 108-0, acquiring the DoE data 108-1, and analyzing the DoE data 108-2. Such steps can follow conventional DoE processes.

Once a circuit model has been modified to include an algorithm that can represent performance corners, a simulation can be run at a particular performance corner 110.

In this way, a simulation can represent changes that can occur at performance corners, which might not be represented in a conventional functional representation.

To better understand features of the embodiment set forth in FIG. 1, one particular pseudocode example will now be described with reference in FIGS. 2A and 2B. The pseudocode may be implemented by those skilled in the art into particular hardware design language versions for use with appropriate simulation software/system.

Figure 2A:
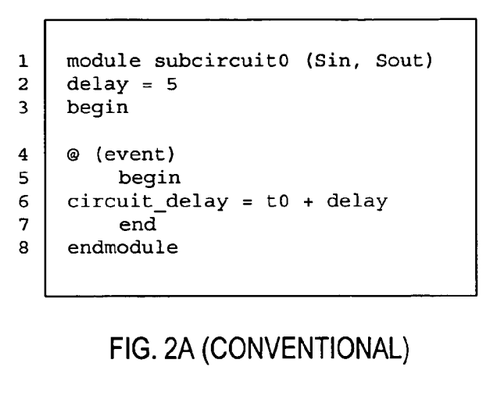
FIG. 2A is a pseudocode example of a conventional circuit model.

FIG. 2A is a pseudocode representation of a conventional module "subcircuit0". The conventional model includes a parameter "delay" that is set to a predetermined value "5" as shown in line 2 of FIG. 2A. That is, the simulation is run with the parameter set at a particular value. Of course, such a value can be changed by one conducting a simulation. However, such a model cannot easily take into account multi-factor effects that can impact such a parameter when the sub-circuit is actually manufactured.

Figure 2B:
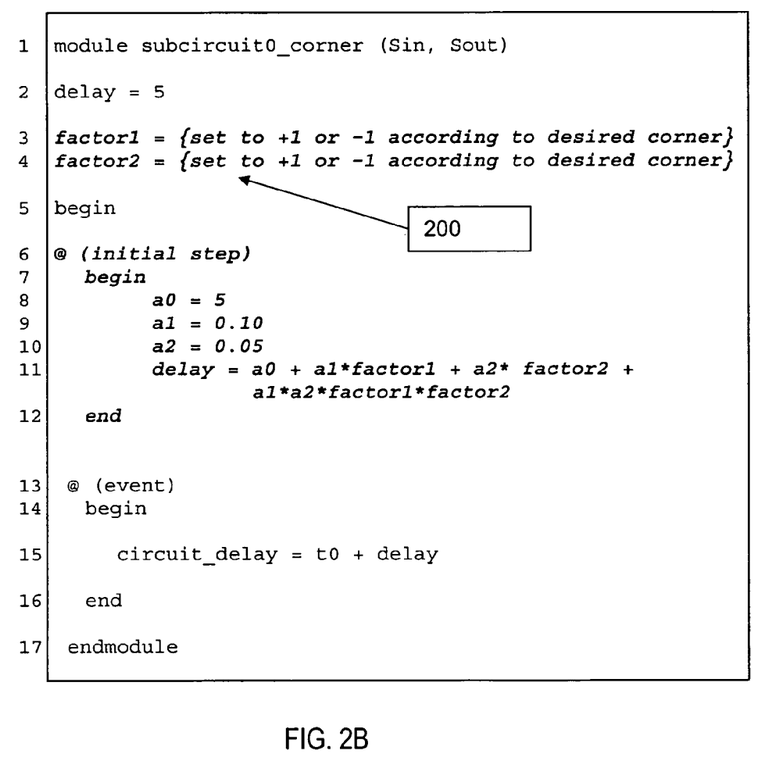
FIG. 2B is one pseudocode example of the circuit model of FIG. 2A as modified to include an algorithm based on experimental statistical analysis, according to an embodiment.

FIG. 2B shows one particular example of a pseudocode representation of the model of FIG. 2A as modified according to an embodiment. The modified module includes multiple factor values 200, each of which can represent a limit for a given factor. In the particular example shown, such factors are normalized values, and thus can range from −1 to +1. The collection of multiple factor values 200 can represent one "corner" condition, or one operating point at which particular factors are at a high or low limit.

Of course, the use of normalized factor values could also include providing a value of 0, along with +1 or −1. This may be particularly so when a DoE includes factors at limit (+1, −1) and midpoint levels (0) for quadratic responses.

Further, the modified model of FIG. 2B also includes initial setup steps "@ (initial step) that can precede any calculation of model performance, and establish a parameter (in this case "delay") based on indicated corner conditions. In the very particular example shown, a multi-factor statistical analysis yields a multiple regression equation having the factor values functioning as independent values, and coefficients (a0, a1, a2) derived from statistical experimental results. The example shown illustrates an algorithm representing a two factor DoE analysis taking into account interactions of the factors, hence that last term "a1*a2*factor1*factor2" in line 11 of the model in FIG. 2B. However, one skilled in the art would realize that a resulting algorithm would depend upon the type of analysis performed and resultant data. Further, non-effective factors or interactions could be omitted.

Accordingly, the circuit model of FIG. 2B has been modified to include an algorithm tied to actual statistical experimental results for a circuit. In this way, more accurate simulation results may be achieved without having to execute a simulation of the circuit at a lower (more detailed) level, such as the transistor level.

It is noted that there is essentially no difference between the amount of simulation runtime involved between a conventional HDL model (like that of FIG. 2A) and an HDL model modified according to an embodiment (like that of FIG. 2B).

Figure 3:
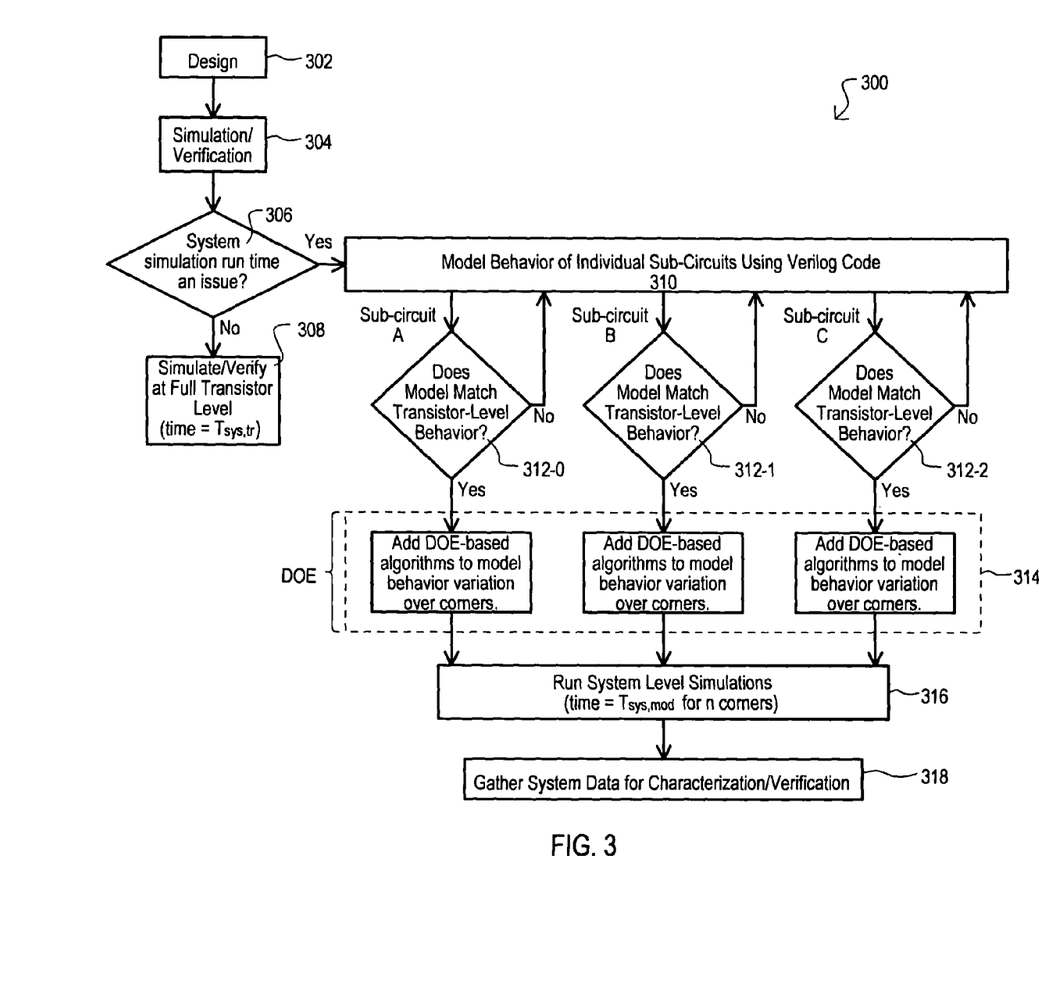
FIG. 3 is a flow diagram of a second embodiment of the present invention.

Referring now to FIG. 3, a method for circuit modeling and simulation is shown in a flow diagram and designated by the general reference character 300. A method 300 can begin with a specification of an initial circuit design (step 302). In the particular example shown, it is assumed that the design is for a relatively larger circuit that includes, or is divided into, a number of smaller circuits or sections, referred to herein as "sub-circuits". Even more preferably, a design can be created by combining existing sub-circuit designs of an intellectual property (IP) library.

Once a design has been developed, simulation and/or verification can proceed on the design (step 304). What particular type of simulation that is to be undertaken can be based on whether or not simulation runtime is an issue (step 306). In the event runtime is not an issue, the design can be simulated at a full transistor level according to conventional techniques (step 308). Such a simulation can model a circuit (including all sub-circuits), with a high degree of accuracy, as transistors can be modeled based on device physics. However, as understood from step 306, such an approach can take large amounts of time and/or computing resources, and thus can be impractical for initial simulation runs, particularly in industries with very fast design cycles and/or devices with a large number of transistors.

In the event simulation runtime is an issue of concern, the design can be simulated according to HDL models of the sub-circuits (step 310). In the very particular example of FIG. 3, individual sub-circuits are modeled in Verilog-A code. Of course, such a particular language represents but one of many possible embodiments, and should not be construed as limiting to the invention. Sub-circuits could be modeled in essentially any HDL language capable of being modified, as set forth below. FIG. 3 shows an example in which a design includes three sub-circuits, "Sub-circuit A", "Sub-circuit B", and "Sub-circuit C". One skilled in the art would recognize that the number of sub-circuits would vary between designs.

A method 300 can further involve taking each sub-circuit model and determining whether the sub-circuit model matches the transistor level behavior of the circuit (steps 312-0 to 312-2). If not, the model must be corrected or substituted with another model until the model matches a desired behavior.

Once a sub-circuit model has met basic functional criteria, such a model can then be modified according to a statistical analysis performed on such a sub-circuit. In the particular example of FIG. 3, such a step includes adding a DoE based algorithm or algorithms to a model of each sub-circuit. Such an algorithm or algorithms can enable a sub-circuit model to more accurately represent behavior over operational "corners" (step 314).

In one particular arrangement, a DoE (Design of Experiments) can be performed to gather data about sub-circuit parameters to be modeled. Such parameters can include, as but a few examples, node rise time, block propagation delay, or signal threshold limit. Such parameters can represent larger block functions as well. As but one example, a parameter can include a voltage controlled oscillator (VCO) gain, for example. A method 300 can take the output of this DoE analysis and create mathematical algorithms that can faithfully represent these sensitivities using HDL constructs.

Such algorithms can be created by using a macro, for example using Visual Basic® in Excel® of Microsoft Corporation, of Redmond, Wash. In such an arrangement, a user can interface with the macro through a graphical user interface (GUI). A macro can perform the functions: processing of raw characterization data, computation of response algorithms, and annotation of HDL constructs into a behavioral model. As but one very particular example, such a macro can operate with spreadsheet data that includes DoE factors for multiple experiment runs, and corresponding experiment results. According to well known conventional techniques, from such data a macro can derive coefficients for a multiple regression algorithm that utilizes DoE factors as variables.

Once such DoE based algorithms have been added to an HDL model, such a modified HDL model can be used in simulation to more accurately reflect changes in circuit behavior owing to operational conditions, such as process, voltage, and temperature (PVT) variations, than is the case for conventional HDL models. Applicants believe this use of DoE methods in conjunction with HDL circuit-modeling practices is a novel concept.

Advantageously, each sub-circuit model can code DoE based algorithms to enable the passing of different operational corner information into the model. Thus, particular corner conditions can be set in each model via a single operation (script, program, subroutine, etc.). Preferably, corner information can include process, voltage, and temperature (PVT) corners, as well as other more model specific conditions, such as a control or configuration input for the model.

Once HDL models for each sub-circuit have been modified with DoE based algorithms, a simulation can be executed on the overall design (system) that incorporates all of the sub-circuits. Such a simulation can be executed for one or more corner conditions (step 316). In the example of FIG. 3, n corner conditions can be simulated. That is, a simulation can pass one set of corner conditions to each sub-circuit model, and then execute a simulation. Once the simulation is complete, this can be repeated for another set of corner conditions until all n corner conditions have been simulated.

It is noted that there is essentially no difference in simulation runtime between a design incorporating conventional HDL models and one incorporating HDL models as modified by the embodiments.

In one embodiment, key variables and pointers can be set up in a circuit simulator (in one exemplary embodiment, Antrim Aptivia, originally manufactured by Antrim Design Systems, Inc., and since acquired by Cadence Design Systems, Inc., of San Jose, Calif., in another example, Eldo™ manufactured by Mentor Graphics Corporation of Wilsonville, Oreg.) to work with the new HDL methodology. For example, a routine (e.g., a script) can be given a set of corner conditions by a user or other input. Such a script can then search each HDL sub-circuit model for any of a number of predetermined parameters, and then set the parameter values according to the set of corner conditions.

Once system level simulations have been run for all n corner conditions, system data can be gathered for characterization/verification of the design (step 318).

It is noted that a method like that of FIG. 3 can provide time savings over more time consuming approaches, such as simulations executed at a transistor level. At the same time, such a method can provide more accurate results than fast approaches, such as those using conventional HDL models. More particularly, an overall time savings according to the above embodiment can be generally represented as follows:

Time savings$\approx n \times (T_{sys,tr} - T_{sys,mod})$ where n is the number of corner conditions to be simulated, $T_{sys,tr}$ is the time required to execute a transistor level simulation, and $T_{sys,mod}$ is the time required to execute a simulation based on conventional HDL sub-circuit models.

In this way, circuit operations at corner operating conditions can be simulated at an HDL level in a faster fashion than lower (i.e., transistor) level approaches. Further, each corner condition simulation can have essentially the same runtime as the conventional HDL simulation.

A method 300 according to the above embodiment has been used successfully on a variety of circuits including phase locked loops (PLLs), voltage controlled crystal oscillators (VCXOs), and voltage/current references.

Figure 4:
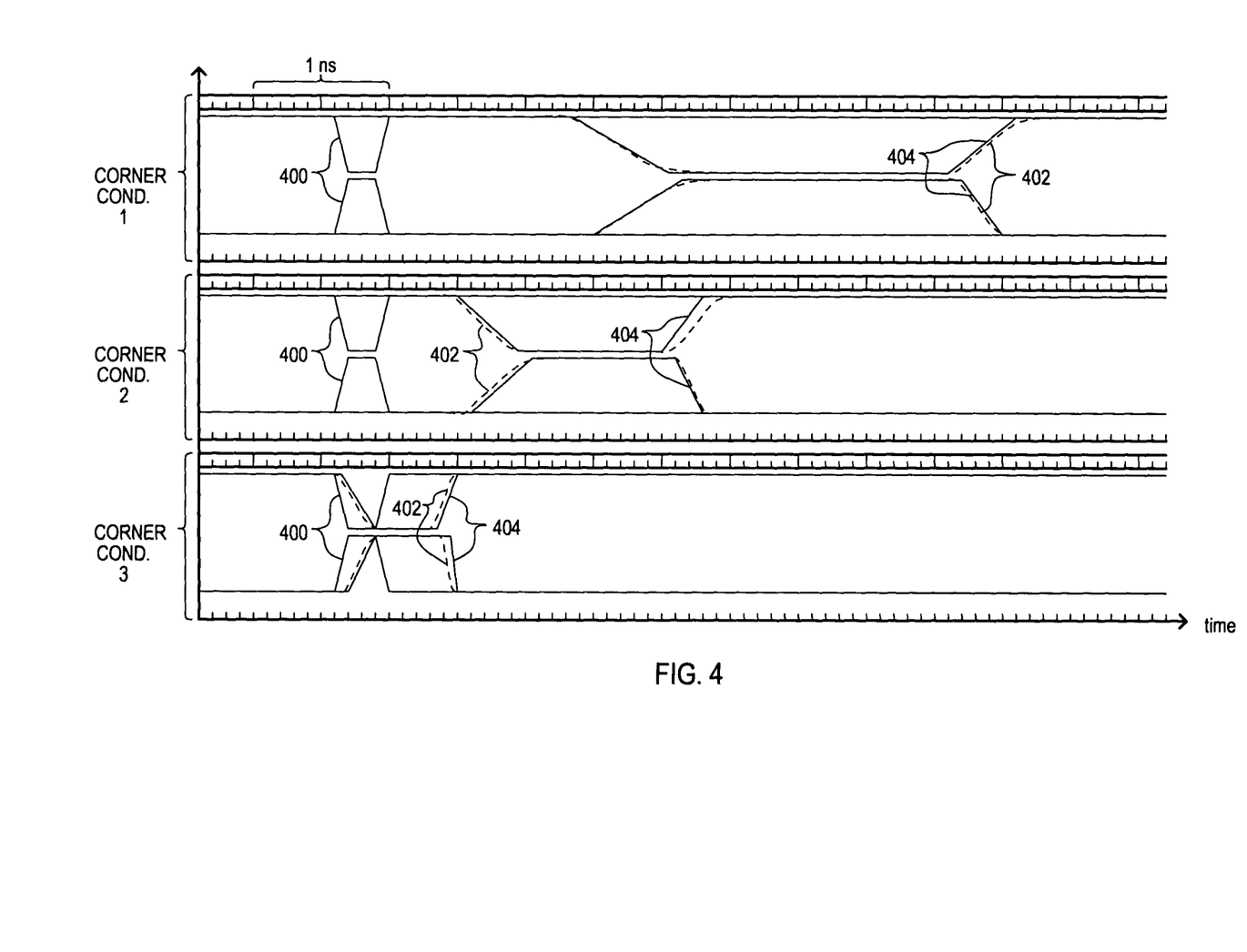
FIG. 4 is a timing diagram illustrating simulation results between conventional circuit models and a circuit model according to an embodiment of the present invention.

One particular example comparing conventional modeling versus that achieved according to the above embodiment of FIG. 3 is shown in FIG. 4. FIG. 4 is a timing diagram that illustrates the relative accuracy between a transistor-level model, a conventional HDL model, and a modified HDL model according to an embodiment of the present invention. FIG. 4 shows waveforms for a PLL sub-circuit, including a simulation response (solid lines) 400 for a conventional Verilog-A model, a simulation response (dashed lines) 402 for a conventional transistor level mode, and a simulation response (solid lines) 404 for a Verilog-A model modified according to an embodiment of the present invention.

While the present invention includes methods of designing, simulating (and verifying) circuits, the present invention may also include circuit HDL model structures. Such circuit HDL model structures can be derived from statistical experiments undertaken on lower level (more detailed) circuit models that generate statistical performance data for such circuits. Such HDL circuit models can then be used, according to conventional design techniques, to generate layout and corresponding mask patterns for manufacturing an integrated device. In some cases, more particularly HDL models of digital circuits, HDL circuit models can be used to generate layout and mask patterns according to conventional circuit synthesis techniques.

Particular model structure examples according to the embodiments will now be described with reference to FIGS. 5 and 6A to 6C.

Figure 5:
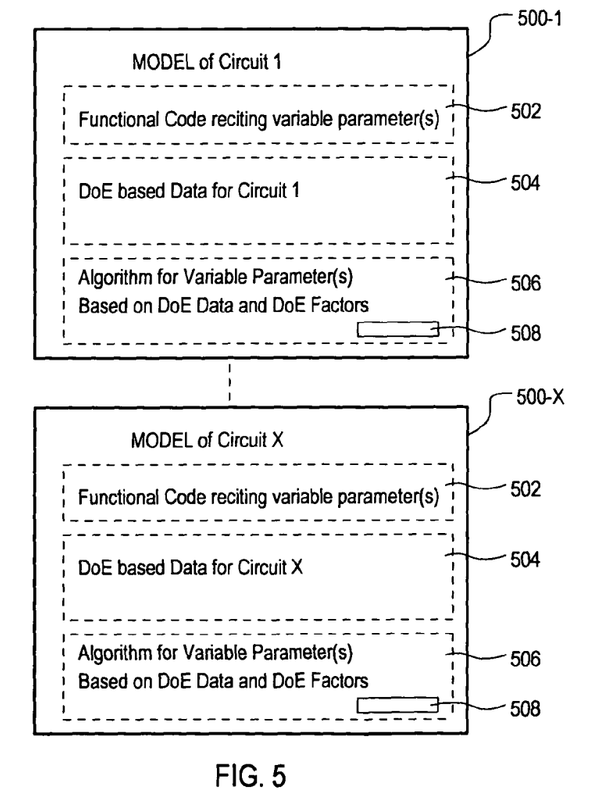
FIG. 5 is a block diagram of circuit models according to an embodiment of the present invention.

FIG. 5 shows a general circuit model structure according to one embodiment of the present invention. The circuit model structures may be formed or otherwise resident on a machine readable medium. FIG. 5 illustrates multiple circuit models 500-1 to 500-X representing a collection of modules, such as a design library or the like. Such circuit models (500-1 to 500-X) can thus be conceptualized as sub-circuit models that can be combined with one another, or with other sub-circuit models, to form a larger design for an integrated circuit device.

Each circuit model (500-1 to 500-X) can include functional code 502 that describes the desired circuit function. Such functional code 502 can refer to a parameter (or parameters) that is variable. More particularly, functional code 502 can refer to a parameter (or parameters) that can vary according to factors previously investigated by a statistical analysis (e.g., DoE), including but not limited to variation in transistor speed, resistance, and capacitance arising due to process variation, power supply level, ambient temperature, and the like.

Each circuit model (500-1 to 500-X) can also include DoE based data 504 for the circuit. For example, such DoE based data can represent effects of particular DoE factors (and/or interactions between such factors) on a variable parameter. As but one very particular example, DoE based data 504 can include code for defining equation coefficients for an algorithm representing the variable parameter.

Each circuit model (500-1 to 500-X) can further include an algorithm 506 describing each variable parameter for the circuit model. Such an algorithm 506 can be based on DoE data and DoE factors. As but one very particular example, an algorithm 506 can include an equation utilizing constant values from DoE based data 504 for the model, and variable values corresponding to corner conditions.

Within (or otherwise associated with) each algorithm 506, can be corner dependent variables 508. Corner dependent variables can be established within each model prior to simulation. For example, a script or other routine can set such variables 508 prior to each simulation run.

In this way, circuit models can be self-contained models possessing experimentally established data, and parameter values defined by one or more algorithm based on experimental results.

Figure 6A:
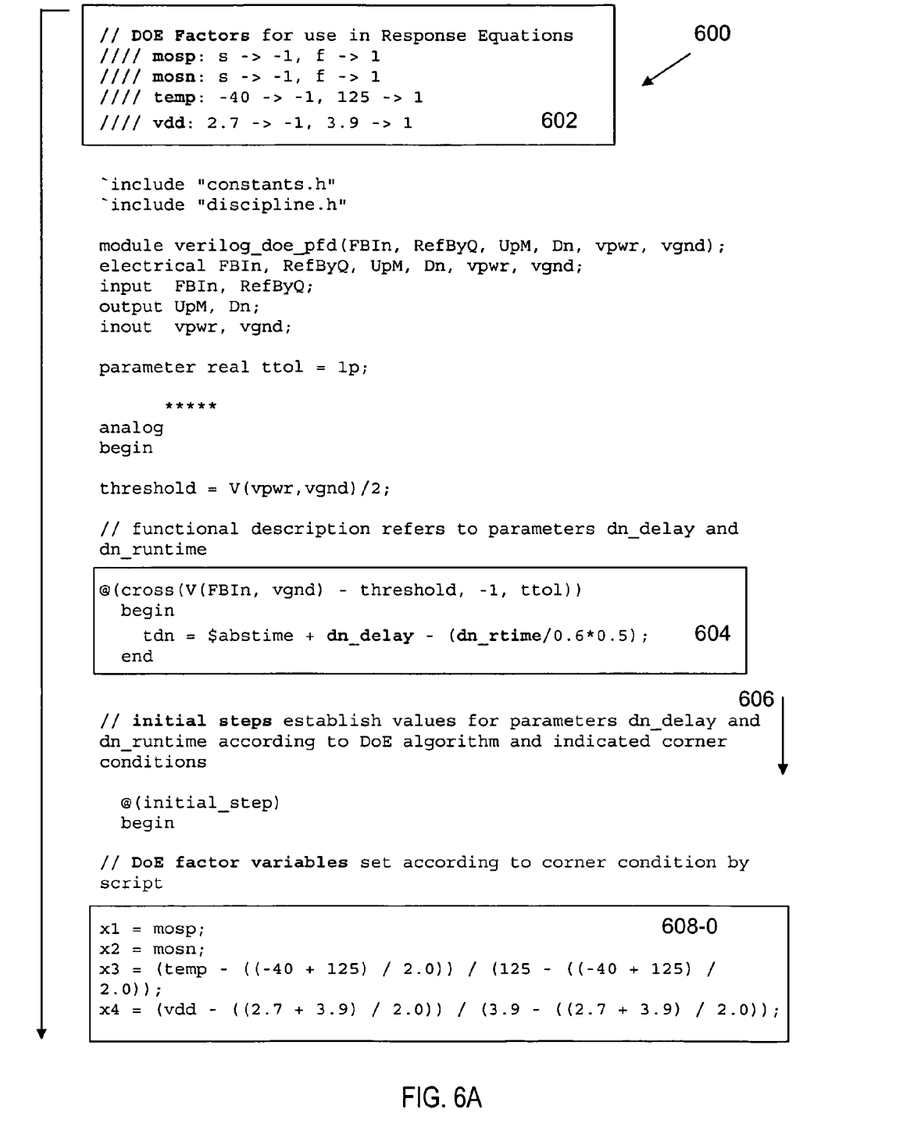
FIGS. 6A to 6C show one Verilog-A code example of a circuit model according to another embodiment of the present invention.
Figure 6B:
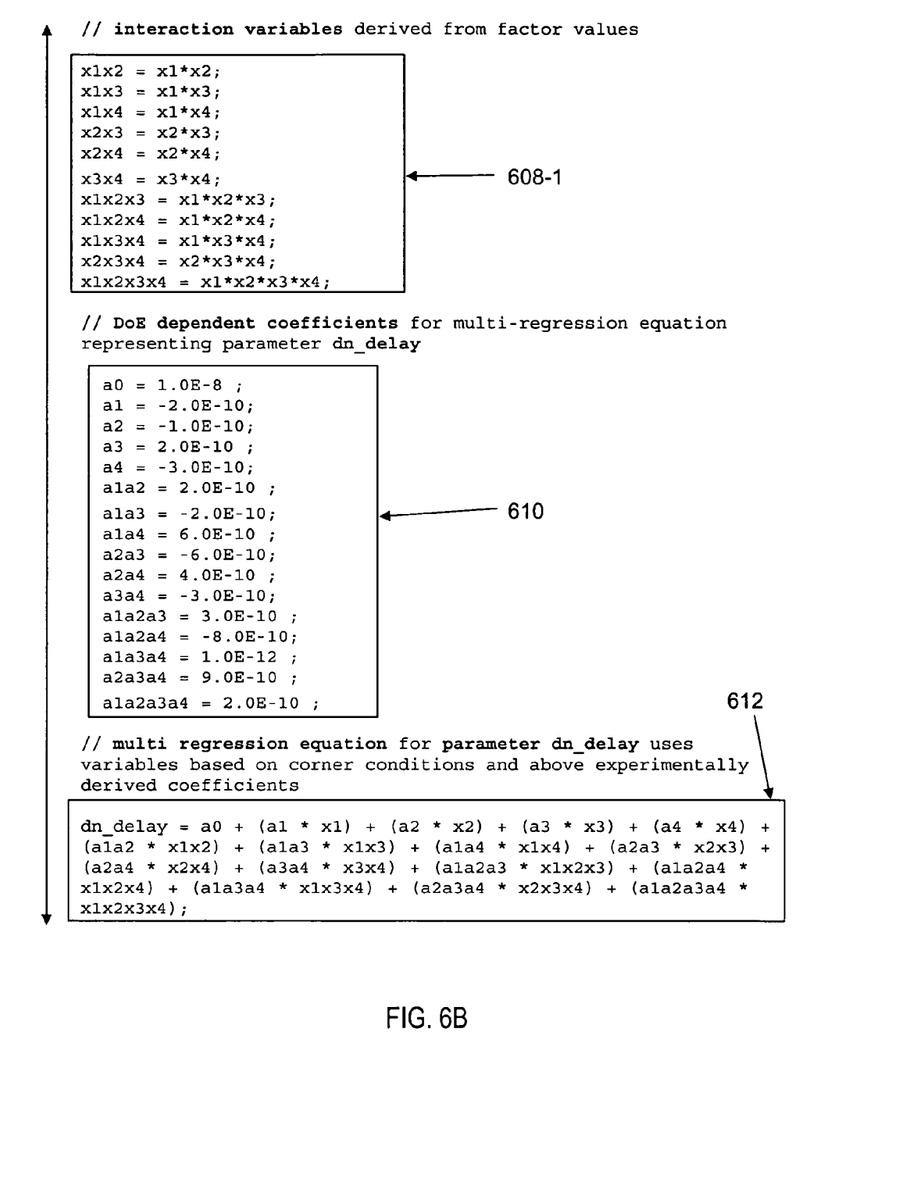
Figure 6C:
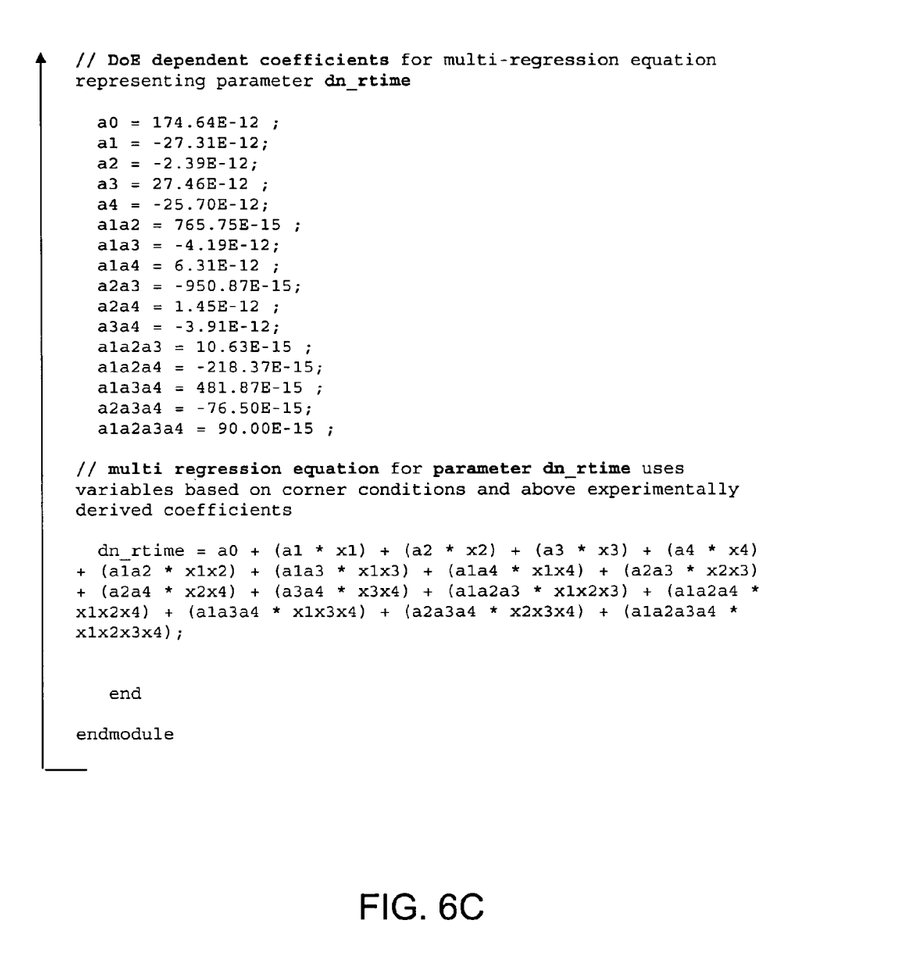

A very particular example of one of numerous possible circuit models developed according to the embodiments is set forth in FIGS. 6A to 6C. FIGS. 6A to 6C show one example of portions of a Verilog-A circuit model for a module named "verilog_doe_pfd", designated by the general reference character 600. Portions of the circuit model have been excluded to avoid unduly cluttering the view.

Referring now to FIG. 6A, a circuit model 600 can provide a functional response that can vary according to a particular factors 602: mosp, mosn, temp and vdd. Variable "mosp" can be a speed of a p-channel MOS type transistor, variable "mosn" can be a speed of an n-channel MOS type transistor, "temp" can be an ambient operating temperature, and "vdd" can be power supply voltage. Of course, as understood from the above descriptions, the present invention could include various other factors investigated by statistical experiments.

Circuit model 600 shows a functional description 604 defining a circuit value "tdn" that depends upon two variable parameters "dn_delay" and "dn_rtime". Such variable parameters will have been previously modeled with a DoE. That is, parameters "dn_delay" and "dn_rtime" can be parameters evaluated according to variances in factors mosp, mosn, temp and vdd.

Actual values for the variable parameters can be established, prior to simulation, by initial steps 606 established by the circuit model code. Such initial steps 606 can establish factor values dependent upon a corner condition. In FIG. 6 first factor variables x1, x2, x3 and x4 can be based on initial DoE factors mosp, mosn, temp and vdd, respectively 608-0.

Referring to FIG. 6B, in the example shown, interaction variables can be derived from first factor variables 608-1. Such first factor variables and interaction variables may then be drawn upon to calculate variable parameter values.

Initial steps 606 can also draw upon DoE data derived for the circuit. In the example of FIGS. 6A to 6C such DoE data can be particular for each variable parameter. Thus, FIG. 6B shows DoE data 610 that corresponds to the variable parameter "dn_delay". In the very particular example shown, DoE data 610 can be coefficients of a multiple regression equation for such a variable parameter.

Referring to FIG. 6B, a model 600 can further include an algorithm 612 for deriving each variable parameter according to a DoE analysis. The very particular example of FIG. 6B shows variable parameter "dn_delay" can be expressed as a multiple regression equation, utilizing coefficients from code section 610 and variables from code section (608-0 and 608-1).

FIG. 6C shows DoE data and the algorithm for the other variable term "dn_rtime". These code portions have the same general structure as those for "dn_delay" in FIG. 6B, and thus are readily understood by referring to FIG. 6B.

From the above, it is understood that essentially any circuit parameter examined according to a statistical analysis (e.g., DoE) can be modified by declaring such a parameter to be a variable, and then defining the variable according to an algorithm reflecting the analysis results, such an algorithm having corner conditions as variable values defined prior to simulation.

As noted above, according to the present invention, once an HDL model has been modified by inclusion of DoE based data and a corresponding model algorithm, corner condition values can be set in each such model prior to a simulation to generate a simulation result reflecting the corner condition.

Figure 7:
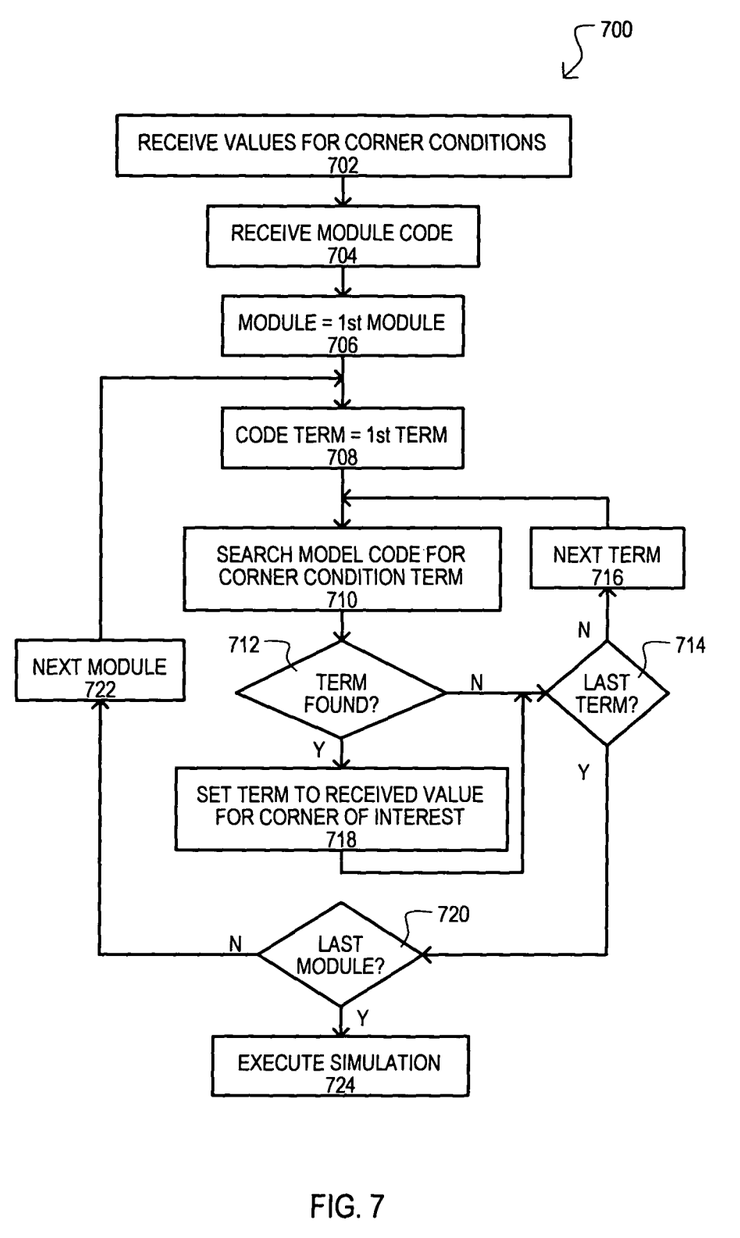
FIG. 7 is a flow diagram of a corner condition setting method according to an embodiment of the present invention.

One very particular example of a routine for setting such values in a number of HDL models is set forth in FIG. 7 in a flow diagram, and designated by the general reference character 700. It is understood that a variable setting method 700 can be a routine separate from HDL simulation software, or a routine incorporated into such software. Further, such a method 700 could be split between different software applications.

A variable setting method 700 can include receiving values for corner conditions (step 702). Such a step can include a user entering the conditions for a particular corner, or a routine reading predetermined corner conditions from some predetermined location. In one very particular example, algorithms with the HDL models can be normalized, thus any or all of the corner conditions can represent the limits of a given factor of the experiment and have a value of +1 or −1, or in the case where a DoE includes midpoint levels, a value of 0.

In such a normalized arrangement, a model can also receive values between +1 and −1, and provide an interpolated response. Further, a model could even receive values outside of +1 to −1, and thus extrapolate outside the DoE conditions.

A method 700 can also include receiving module code (step 704). This can include having the code for a multiple numbers of modules (i.e., models of circuits or sub-circuits) loaded on a storage medium, such as a hard drive, or the like. Even more particularly, such a step can include receiving one or more circuit intellectual property (IP) libraries. It is assumed that such modules have already been modified according to the present invention, and thus include known code terms for the corner dependent variables.

Once HDL code for multiple modules has been received, a method 700 can begin with a first module (step 706) and first code term (step 708). For example, in the case of the model shown in FIGS. 6A to 6C, such terms can be "mosp", "mosn", "temp" and "vdd". A first module code can be searched for the term of interest (steps 710 and 712). If the term is found, it can be set to a value to reflect the particular corner condition of interest (step 718). This can continue until a last term has been searched (steps 714 and 716).

A method 700 can then proceed to perform the same term search and setting steps for all modules received (steps 720 and 722) until a last module has been processed. A simulation can then be performed on a design (or designs) incorporating one or all of the modules (step 724).

A method 700 can be repeated for each desired corner condition.

In this way, corner conditions can be automatically set in multiple HDL circuit models that are combined into one design.

While the present invention embodies methods and circuit model structures as illustrated above in particular examples, the present invention can also include a system for incorporating statistically derived circuit performance data into an HDL model of the circuit. One very particular example of such a system is shown in FIG. 8, and designated by the general reference character 800.

A system 800 can include one or more processors 802 for executing instructions set forth in machine readable code. A processor 802 can operate in conjunction with an operational memory 804, such as a random access memory (RAM) as but one example, as well as a storage memory 806, such as one or more hard disk drives, as but one example.

Figure 8:
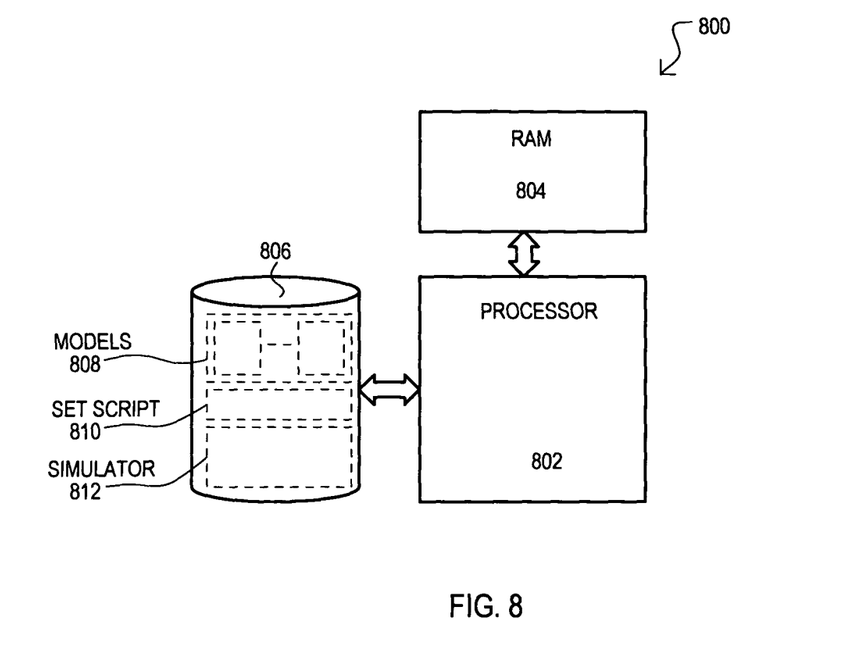
FIG. 8 is a block schematic diagram of a system according to an embodiment of the present invention.

In the particular example of FIG. 8, a storage memory 806 can include sections 808 that store HDL models for one or more circuits, preferably multiple sub-circuits that may be combined into a single design. Such models can be HDL code modified according to the present invention to include DoE (or other statistical experimental) based responses. A storage memory 806 can also include sections 810 for storing instructions for setting corner parameter values, such as script, subroutine or other format. Thus, according to user defined values, a processor can automatically set corner conditions in all of the models residing in 808 or only a sub-set of such models. A storage memory 812 may also store simulator software in sections 812. Such simulator software can be executed by processor 802 according to conventional techniques to run a simulation on one, or combinations of the HDL models to provide a result reflecting a design response at a predetermined condition.

In this way, a system 800 can provide simulation results reflecting particular operating conditions that may be more accurate than a conventional HDL approach, yet faster than a transistor level simulation.

Advantages of the various above embodiments can include modeling and simulation that can be faster (using modified HDL models) while maintaining accuracy over corner conditions (e.g., PVT corners) by incorporating responses generated by a statistical analysis (e.g., DoE derived algorithms) of manufactured versions of the circuits. A further advantage is that it can allow for more system-level simulations to be run before actual manufacturing layers (e.g., wafer masks) for a design are generated (tapeout), thereby mitigating risk and increasing confidence in the design. Such a feature can be important for designers, particularly as wafer mask costs increase.

Further advantages of the above disclosed methods, systems, and models can be a significant decrease in simulation time at both block and system levels, more top-level simulations per unit time, which can give more confidence in the design, and shorter development time, even at block-level, by reducing simulation matrix sizes.

Furthermore, the improved method can be accurate enough to represent higher-order circuit phenomena, and accurately model corner conditions.

Moreover, relatively little overhead can be required to implement the embodiments of the invention. Inclusion of the algorithms and associated data into existing HDL models can occupy a relatively small amount of space. Further, such operations can require relatively little computing resources or software, as conventional statistics software can be capable of generating the necessary data for such models (e.g., multiple regression equation and corresponding coefficients).

Still further, the methodology can be portable between circuit blocks, designs, and design centers. Yet another advantage can be that the existing HDL models (e.g., Verilog-A models) do not have to be changed with respect to their functional description. Only the infrastructure which sets them up needs to be changed, further reducing risk that error could be introduced into the models.

Yet another advantage can be that corner-sensitive models can reduce the number of performance-based questions designers must answer with each reuse of the models (IP).

Figure 9A:
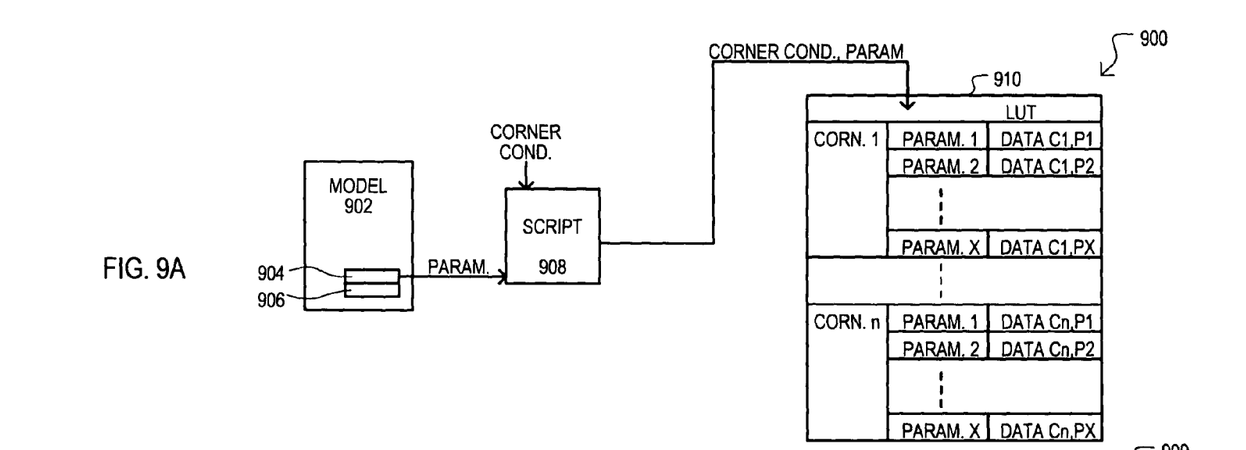
FIGS. 9A and 9B are diagrams showing an alternate method/system according to an embodiment of the present invention.
Figure 9B:
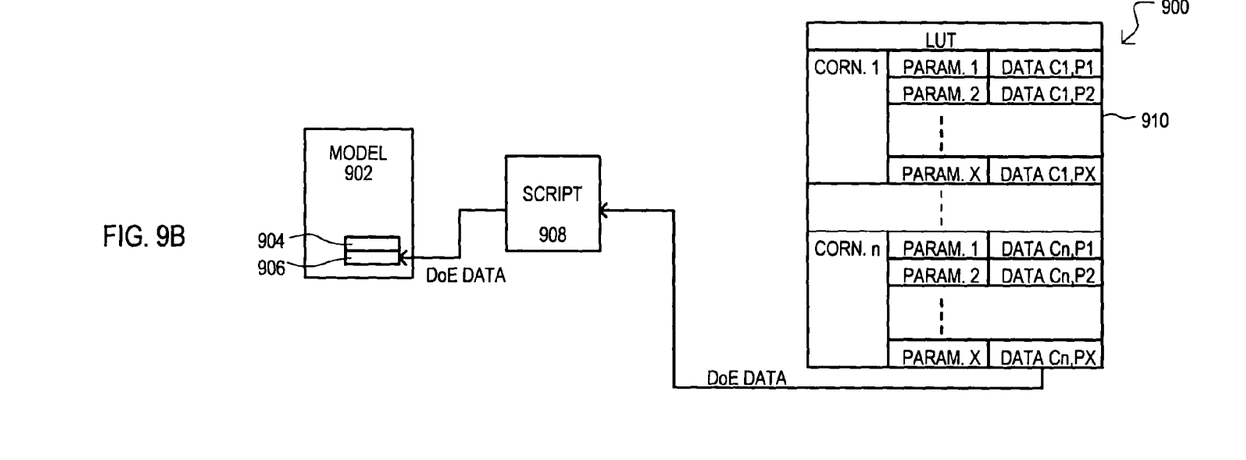

Of course the above embodiments represent but embodiments of the present invention, and so can be subject to variation. As but one example, in an alternate embodiment, lookup tables (LUTs) may be used which are searched according to a corner condition of interest. Then, resulting data for such a corner condition can be inserted into the code. Such an arrangement is shown in FIGS. 9A and 9B. In such a system/method 900, modified HDL models (one shown as 902) can be created that include a parameter value 904 that can operate on conjunction with data derived from statistical (DoE) analysis of manufactured devices. A process 908 (e.g., script) can determine which parameters are included in model and receive conditions for a corner of interest. According to such values, a LUT 910 can be accessed.

As shown by FIG. 9B, access to a LUT can yield data, which can then be inserted into code for the model 902.

An approach like that of FIGS. 9A and 9B is more burdensome than the previously disclosed embodiments, as a LUT database can be of considerable size, and will have to be tied to each corresponding HDL model, to ensure the model can provide the appropriate response over desired corner conditions. Thus, while the embodiment, is functional, additional care will have to be taken to ensure that the database continues to be in place, up-to-date, and uncorrupted, wherever a corresponding model is to be used. In addition, due to the size of such a database, considerable disk space must be dedicated to accommodate the database whenever a model is simulated over a corner condition.

It is understood that while the above embodiments have illustrated particular types of algorithms derived from DoE analysis, the present invention should not be construed as being limited to any particular type of statistics derived response model for a given circuit. For example, the above embodiments can utilize linear and non-linear response algorithms derived from methods other than DoE.

For purposes of clarity, many of the details of (subject matter) and the methods of designing and manufacturing the same that are widely known and are not relevant to the present invention have been omitted from the following description.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

It is also understood that other embodiments of this invention may be practiced in the absence of an element/step not specifically disclosed herein. That is, an inventive feature could include the absence of a particular element step of a disclosed embodiment.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method for designing circuits, comprising:
   a) creating an initial HDL model of at least one circuit;
   a') determining if the initial HDL model accurately matches desired behavior for the at least one circuit, and creating a new initial HDL model if the initial HDL model does not accurately match desired transistor level behavior;
   a") establishing a plurality of variables for an algorithm for a parameter value, wherein the parameter value is derived from a design of experiments (DoE) statistical analysis performed on an initial design of the at least one circuit, and wherein the algorithm includes a multiple regression equation for generating the parameter value, wherein the multiple regression equation includes at least one term representing an interaction between the plurality of variables;

b) creating an HDL model from the initial HDL model or the new HDL model for the at least one circuit, wherein the HDL model includes the algorithm for the parameter value; and c) executing a simulation of the at least one circuit with the HDL model for each of a plurality of corner conditions represented as different combinations of possible values for the plurality of variables.

2. The method of claim 1, further including:
prior to a)
performing the design of experiments (DoE) statistical analysis on the initial design of the at least one circuit to gather parameter data for the at least one circuit.

3. The method of claim 2, wherein the corner condition corresponds to DoE factor values.

4. The method of claim 3, further including:
determining if simulation results are needed for more than one corner condition, and if more than one corner condition is needed, performing step a') and step b) for each such corner condition.

5. The method of claim 3, wherein:
the DoE factor values comprise a highest operating temperature of the DoE and a lowest operating temperature of the DoE.

6. The method of claim 3, wherein:
the DoE factor values comprise a highest value of a power supply voltage of the DoE and a lowest value of the power supply voltage of the DoE.

7. The method of claim 3, wherein:
the DoE factor values comprise a highest value of a predetermined transistor performance characteristic and a lowest value of the predetermined transistor performance characteristic.

8. The method of claim 7, wherein:
the predetermined transistor characteristic is selected from the group consisting of a switching speed of an n-channel insulated gate field effect transistor, and a switching speed of a p-channel insulated gate field effect transistor.

9. The method of claim 3, wherein:
the variables that represent corner conditions are normalized variables, and establishing such variables includes setting such variables to at least +1 or −1.

10. The method of claim 3, wherein:
the performing a DoE analysis includes processing raw characterization data for a behavioral model for the at least one circuit to derive effect values, and
deriving a response algorithm for a parameter based on the effect values; and
the including algorithms includes annotating an HDL construct of the response algorithm into the behavioral model.

11. The method of claim 3, wherein:
performing the DoE analysis includes measuring at least one predetermined parameter of a plurality of lower level models corresponding to multiple experiment runs, each run representing a different combination of factor values.

12. A simulation system, comprising:
a processor configured to execute simulator software; and
a circuit model embodied in machine readable media, wherein the circuit model comprises a plurality of sub-circuit models coupled with the processor, each representing a portion of an integrated circuit, and each sub-circuit model comprising a first code segment that includes hardware design description of the sub-circuit having a function dependent upon at least one variable parameter, and wherein the circuit model further comprises a second code segment configured to generate a value of the at least one variable parameter based on design of experiments (DoE) based data generated from sub-circuits modeled according to the DoE and based on independent variables corresponding to at least DoE factor limits, wherein the second code segment is configured to generate the value of the at least one variable parameter using a multiple regression equation, wherein the multiple regression equation includes at least one term representing an interaction between the plurality of variables.

13. The simulation system of claim 12, further including:
a third code segment comprising the coefficient terms for the second code segment, the coefficient terms being derived from effectiveness values corresponding to at least the DoE factors, wherein each effectiveness value quantifies an ability of a corresponding DoE factor to influence a simulation result, and wherein the multiple regression equation includes coefficient terms and the independent variables.

14. The simulation system of claim 13, wherein:
the independent variables further include combinations of DoE factors; and
the coefficient terms further include effectiveness values.

15. The simulation system of claim 12, wherein:
the at least one algorithm includes independent variables that correspond to sub-circuit factors selected from the group consisting of: a resistor model, a capacitor model, a transistor model, a temperature value, and a power supply value.

16. The simulation system of claim 12, wherein:
the at least one algorithm includes normalized independent variables that correspond to DoE factor limits when set to at least +1 or −1.

17. A system for integrating circuit performance data into a hardware design language (HDL) model of the circuit, comprising:
at least one processor;
a first machine readable media portion that includes HDL model code for a plurality of sub-circuit models that each represent a portion of the circuit, each sub-circuit HDL model code comprising a sub-circuit description code that defines a function of the sub-circuit and includes at least one parameter that incorporates design of experiment (DoE) analysis results of the sub-circuit, wherein the parameter that incorporates DoE analysis results includes an algorithm with factor variables representing DoE factor limits, wherein the algorithm includes a multiple regression equation configured to generate a value of the parameter, wherein the multiple regression equation includes at least one term representing an interaction between the plurality of variables; and
a second machine readable media portion that includes setting code for each sub-circuit HDL model code.

18. The system of claim 17, wherein:
the factor variables are normalized, and wherein such factor variables represent DoE factor limits when set to at least −1 to +1.

19. The system of claim 17, further including:
a third machine readable media portion that includes simulator code that generates simulation result data based on the plurality of subcircuit models performing at conditions established by the setting code.

* * * * *